Feb. 14, 1933.　　　W. TIMSON　　　1,897,873
DASHPOT
Filed Sept. 9, 1931
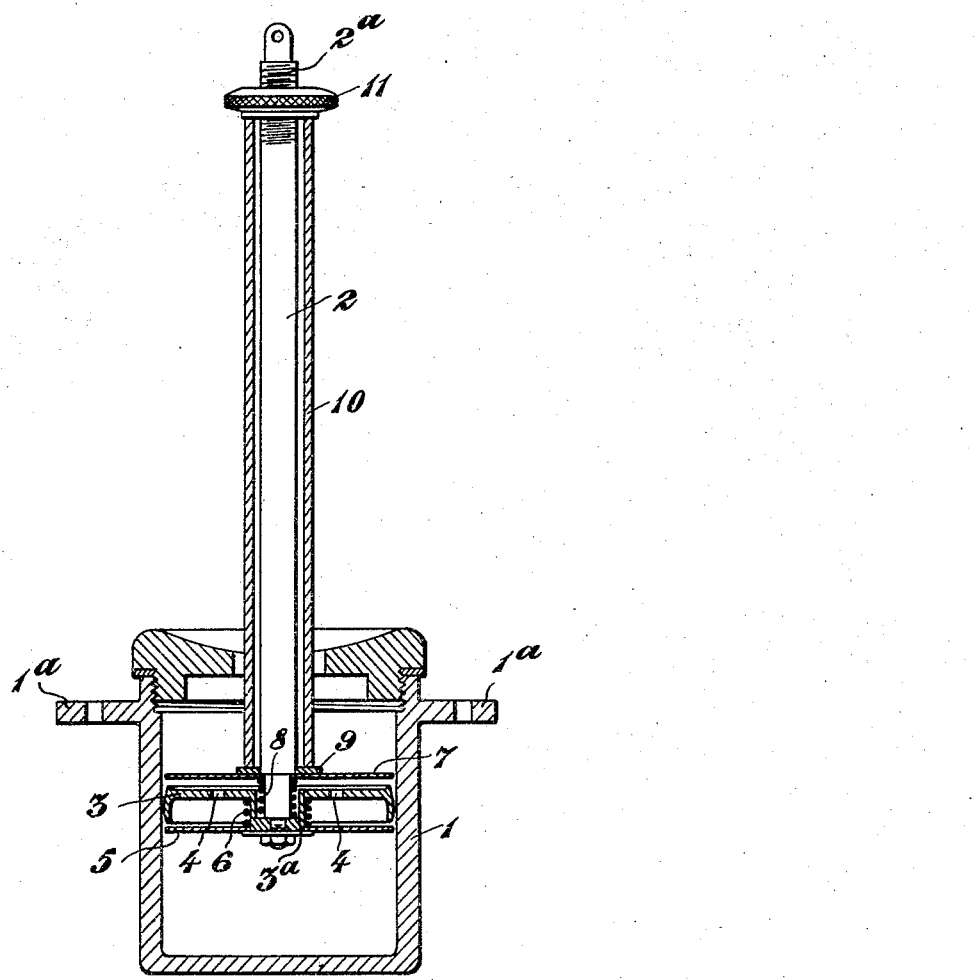
Inventor:- William Timson.
By George E. Folkes.
Attorney.

Patented Feb. 14, 1933

1,897,873

UNITED STATES PATENT OFFICE

WILLIAM TIMSON, OF SOHO FOUNDRY, BIRMINGHAM, ENGLAND, ASSIGNOR TO W. & T. AVERY LIMITED, OF BIRMINGHAM, ENGLAND

DASHPOT

Application filed September 9, 1931, Serial No. 561,889, and in Great Britain October 29, 1930.

This invention has reference to improvements in or relating to dashpots and is concerned more particularly with fluid dashpots for use with weighing apparatus.

In connection with the use of dashpots for weighing apparatus it is found that the damping effect of the damping medium in the dashpot varies with the changes of temperature whereby it has been necessary to manually effect an adjustment of part of the dashpot mechanism in order to compensate for differences in the damping effect due to such changes.

The present invention has for its object to eliminate the necessity for the manual adjustment operation.

The invention consists of an improved dashpot wherein means governed by a difference of co-efficient of expansion of two members of the piston is provided for automatically compensating or correcting changes in the damping effect of the fluid medium in the dashpot caused by variations of temperature.

The preferred embodiment of the invention will now be described in its application to a liquid dashpot of the piston and cylinder type for use in connection with weighing apparatus.

The drawing appended to the specification is a sectional elevation of a dashpot constructed according to this invention.

According to the said embodiment of the invention the dashpot cylinder is fixed to the frame of the weighing apparatus by means of fixing screws which pass through the flanges 1ª of the cylinder 1.

The piston rod 2 is pivotally suspended from a moving part of the weighing apparatus and has secured to its lower end a piston 3 of an inverted dish formation the upper surface of which is provided with a plurality of equi-distantly spaced holes 4.

Disposed below the lower rim of the piston 3 is a disc 5 which normally is maintained spaced from the piston by means of a coil spring 6 which is disposed around a central boss 3ª formed at the piston, one end of said spring abutting the underside of the piston and the other end abutting the upper face of the disc 5. Disposed above the piston is a second disc 7 which is loosely mounted on the reduced lower end of the piston rod 2, the said disc 7 being maintained in a raised position relatively to the upper surface of the piston 3 by means of a coil spring 8 the lower portion whereof is located within a recess formed in the central boss 3ª of the piston 3 the upper end of the spring 8 bearing against the underside of the upper disc 7. The upper surface of the disc 7 is adapted to abut a washer 9 loosely mounted to surround the piston rod 2 and the washer 9 abuts the lower end of an ebonite tube 10 surrounding the piston rod 2 the upper end of the tube 10 abutting a knurled nut 11 which is adjustably mounted on the screwed upper section 2ª of the piston rod 2 and is employed to effect the initial adjustment of the disc 7 relative to the piston 3.

The degree of upward movement permitted to the disc 7 is limited by means of a shoulder on the piston rod at the junction between the reduced end of the rod and the main section thereof.

The operation of the device is as follows:—

The inner coil spring 8 maintains the upper disc 7 in abutment with the washer 9 which co-operates with the lower end of the ebonite tube 10. In the event of changes of temperature the ebonite tube 10 expands or contracts according to the nature of the change and as the co-efficient of expansion differs from that of the metal from which the piston 3 and piston rod 2 are constructed the change in length of the ebonite tube 10 moves the upper disc 7 towards or away from the upper surface of the piston 3 according as to whether an expansion or contraction of the ebonite tube takes place. The movement of the upper disc 7 towards or away from the upper surface of the piston 3 varies the rate of flow of the damping fluid through the apertures 4 in the said piston in known manner. The length of the ebonite tube 10 is determined by experiment so that expansion or contraction compensates automatically for the changes accruing in the damping medium due to the variations in temperature whereby the rate of flow is automatically correlated to the temperature.

What I claim is:—

A dashpot comprising a cylinder, a fluid damping medium within the cylinder, a piston reciprocably mounted within the cylinder, a piston rod for connecting the piston to the member to be controlled by the dashpot, ports in the piston through which the damping medium may pass, a disc movably mounted on one side of the piston, means for limiting the movement of the said disc, spring means normally tending to move the disc away from the piston, a second disc movably mounted on the opposite side of the piston, a spring means tending to move the said second disc away from the piston, a member coaxially disposed relatively to the piston rod and adapted to bear on the second mentioned disc, said member being rigid and made from material having a different co-efficient of expansion from the material from which the piston rod is made and a fixed abutment for the other end of the said member, the difference in the co-efficient of expansion between the aforesaid member and piston rod resulting in the second mentioned disc being moved toward or away from the ports in the piston so as to regulate automatically the flow of the damping medium through the ports in accordance with the temperature conditions obtaining.

In testimony whereof, I have signed my name to this specification.

WILLIAM TIMSON.